United States Patent [19]
Corry

[11] 3,889,174
[45] June 10, 1975

[54] APPARATUS FOR GENERATING THREE-PHASE SINUSOIDAL VOLTAGES

[75] Inventor: Thomas M. Corry, Goleta, Calif.

[73] Assignee: General Motors Corporation, Detroit, Mich.

[22] Filed: July 3, 1974

[21] Appl. No.: 485,435

[52] U.S. Cl. ............................ 321/9 R; 321/DIG. 1
[51] Int. Cl. ............................................. H02m 7/52
[58] Field of Search .......... 321/5, 6, 7, 9 R, DIG. 1; 323/43.5 S

[56] References Cited
UNITED STATES PATENTS
3,725,767  4/1973  Corry .................................. 321/9 R Primary Examiner— Beha, Jr.
Attorney, Agent, or Firm—Howard N. Conkey

[57] ABSTRACT

Apparatus for producing three-phase sinusoidal line-to-line voltage waveforms by construction three-phase line-to-neutral voltage waveforms. A center-voltage generator alternately provides a three-phase, full-wave voltage in the form of upper and lower center flat-top voltage segments in relation to a neutral reference each extending over an interval greater than 60 electrical degrees sequentially distributed to three output lines. An inverter operates in synchronism with the center voltage inverter to produce alternating, flat-top voltages each extending over an interval equal to approximately 60 electrical degrees. A transformer has a low voltage tap coupled to the neutral reference, an input tap coupled to receive the alternating flat-top voltages, a plurality of intermediate taps and a step-up tap in voltage multiplying position relative to the alternating flat-top voltages. The low voltage and intermediate taps are sequentially coupled to respective ones of the three output lines in respective ascending and descending orders in synchronism with the center voltage segments during each flat-top voltage applied to the input tap to complement the upper and lower center voltage segments and complete the line-to-neutral, three-phase waveform. The step-up tap is selectively coupled to the three line conductors so as to commutate the center voltage generator to terminate the respective center voltage segment at the end of its interval. The center voltage segments are selectively coupled to one of the intermediate voltage taps so as to commutate the inverter and terminate the flat-top voltages at the end of their respective intervals.

2 Claims, 4 Drawing Figures

Fig. 4

APPARATUS FOR GENERATING THREE-PHASE SINUSOIDAL VOLTAGES

This invention relates to an apparatus for producing a set of three sine-wave, line-to-line voltages by constructing a set of three non-sine, line-to-neutral voltages, each having a substantially flat-top power center extending over an interval greater than 60 electrical degrees and a plurality of rising and falling voltage steps outboard the flat-top portions. More specifically, this invention relates to such an inverter wherein the flat-top power center portions are generated by a first inverter and the plurality of rising and falling voltage steps are generated by means of an inductor supplied by a second inverter, the first inverter being commutated by the output of the second inverter coupled thereto and the second inverter being commutated by the output of the first inverter which is coupled thereto through the inductor.

The form of three-phase sinusoidal voltage generator to which this invention is directed is described in my U.S. Pat. No. 3,725,767 which issued on Apr. 3, 1973, the contents of which are hereby incorporated by reference. The generator described therein supplies substantially sine-wave, three-phase, line-to-line output voltages by generating three sets of line-to-neutral voltages displaced by 120° from one another, each comprised substantially of flat-top centers combined with stepped ascending or descending voltages. The flat-top centers were generated and coupled to three output lines by a center voltage inverter and the stepped ascending and descending voltages were generated by means of a transformer having a plurality of voltage taps across which the output of a single-phase flat-top voltage inverter was applied. The taps were sequentially coupled in ascending or descending order through a voltage distributor to respective output lines to produce the stepped ascending or descending voltages. The center voltage inverter was commutated by means of a step-up tap in voltage multiplying position relative to the alternating flat-top voltages from the single-phase flat-top voltage inverter which was selectively coupled to the three-phase line conductors. The single-phase flat-top voltage inverter was commutated by means of commutating switches contained therein. I have recognized that if the upper and lower center voltage segments each extend over an interval greater than 60 electrical degrees, one of the upper or lower center voltage segments at the correct polarity is available to commutate the single-phase flat-top voltage inverter. Further, I have recognized that the center voltage segment may be coupled to the single-phase flat-top voltage inverter to effect commutation thereof by the circuitry provided for generating and distributing the stepped voltages. This commutation scheme permits the elimination of the commutating switches and power supplies provided in the aforementioned patent for commutating the single-phase flat-top voltage inverter. In accordance therewith, it is the object of this invention to provide for an improvement of the inverter of the type described in my U.S. Pat. No. 3,725,767 by eliminating commutating switches and power supplies for commutating the single-phase flat-top voltage inverter therein.

The object of this invention is accomplished by providing upper and lower center voltage segments which extend over an interval greater than 60 electrical degrees and coupling a respective one of these voltage segments to one of the taps of the transformer at the instant commutation of the single-phase flat-top voltage is required to provide for the commutation.

The invention may be best understood by reference to the following description taken in connection with the accompanying drawings in which:

FIG. 4 is a timing diagram for the apparatus of FIG. 3 for generating the three-phase line-to-neutral waveforms illustrated in FIG. 2 and for commutation of the center voltage inverter and the flat-top, full-wave, single-phase inverter of FIG. 3.

Figure 1:
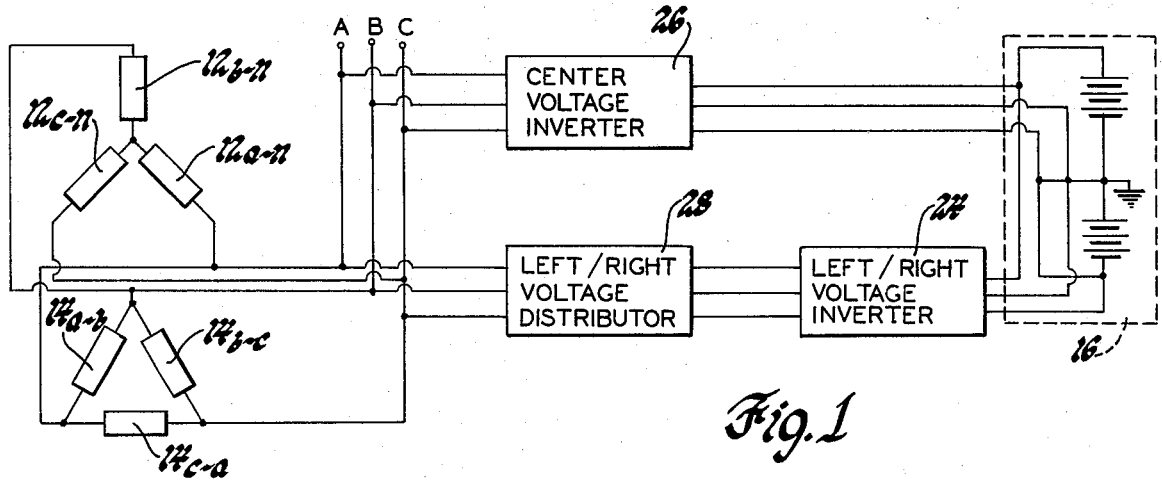
FIG. 1 is a circuit diagram, partially in block form, illustrating a three-phase power system of the type of which the present invention is applicable.

FIG. 1 shows in diagrammatic and block form the three-phase power system of the present invention. The unidirectional power source, indicated at 16, is a source of substantially constant potential, having a grounded center tap as shown. A center voltage inverter 26 is connected to the source 16 and applies line-to-neutral flat-top voltages directly from the source 16 to three output lines A, B, and C in three-phase voltage pulses having a duration at least greater than 60°. The voltage pulses are shown as UC (upper center) and LC (lower center) in the respective line-to-neutral voltages shown in FIG. 2. These voltage pulses are referred hereafter as the upper center and lower center voltage pulses and, alternatively, as the line-to-neutral waveform power center.

The three line conductors A, B and C receive left/right voltages from the source 16 through the left/right or ascending and descending voltage generator or inverter 24 and the left/right voltage distributor 28. The inverter 24 produces the increasing and descreasing voltage waveform LL (lower left), UL (upper left), LR (lower right), and UR (upper right) of the three line-to-neutral voltages illustrated in FIG. 2, and the voltage distributor 28 switches the respective voltages to the appropriate line conductors A, B and C to construct the respective line-to-neutral voltages $V_{a-n}$, $V_{b-n}$, and $V_{c-n}$. The resulting line-to-line voltage is a substantially pure three-phase, sine-wave voltage.

A Y-connected load comprising the load elements $12_{a-n}$, $12_{b-n}$, and $12_{c-n}$ and a delta connected load comprising load elements $14_{a-b}$, $14_{b-c}$, and $14_{c-a}$ are shown connected for AC excitation by the conductors A, B and C.

Figure 2:
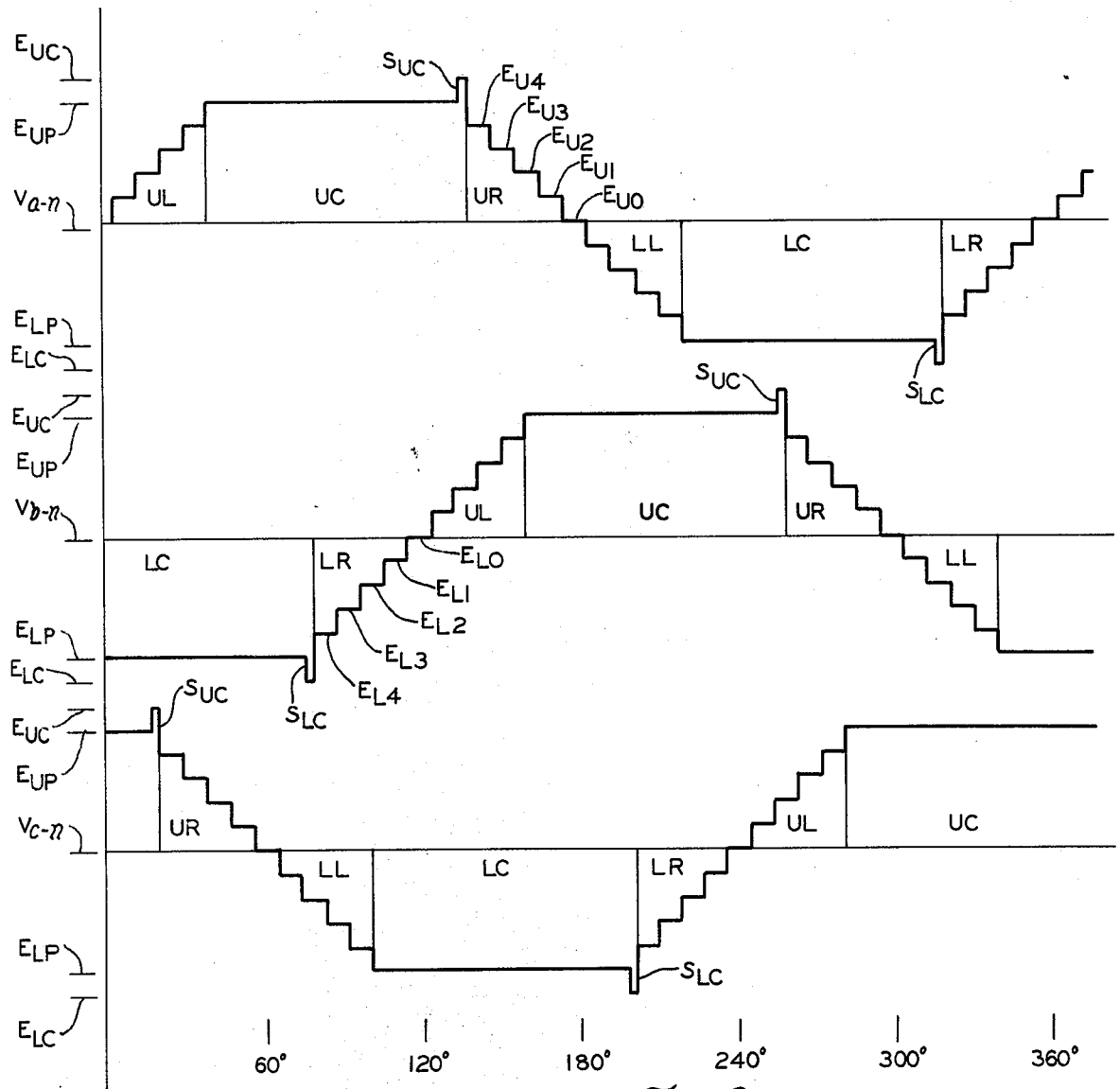
FIG. 2 is a diagram showing, in general form, three line-to-neutral voltages generated in accordance with the present invention.

In the flat-top, line-to-neutral voltage waveforms $V_{a-n}$, $V_{b-n}$, and $V_{c-n}$ shown in FIG. 2, wach cycle of each of the three line-to-neutral voltage waveforms includes an upper center waveform portion UC, an upper right waveform portion UR, a lower left waveform portion LL, a lower center waveform portion LC, and a lower right waveform portion LR. In the specific illustration in FIG. 2, the waveform portions UC and LC are of approximately 99° duration and the waveform portions UL, UR, LL and LR are approximately of 40.5° duration. It is understood that the duration of these waveform portions may be other than as illustrated in FIG. 2, the only restriction for purposes of this invention being that the waveform portions UC and LC have a duration greater than 60 electrical degrees.

The upper center waveform portion UC is constant at an upper potential $E_{UP}$ above ground potential. Similarly, the lower center waveform portion LC is constant at a lower potential $E_{LP}$ below ground potential. The upper left waveform portions UL is defined by an upper left voltage segment which ascends in a series of voltage steps from ground potential to the upper potential $E_{UP}$. The upper right waveform portions UR is defined by an upper right voltage segment which descends in a series of voltage steps from the upper potenial $E_{UP}$ to ground potential. The lower left waveform portions LL is defined by a lower left voltage segment which descends in a series of voltage steps from gound potential to the lower potential $E_{LP}$. The lower right waveform portion is defined by a lower right voltage segment which ascends in a series of voltage steps from the lower potential $E_{LP}$ to ground potential.

Figure 3:
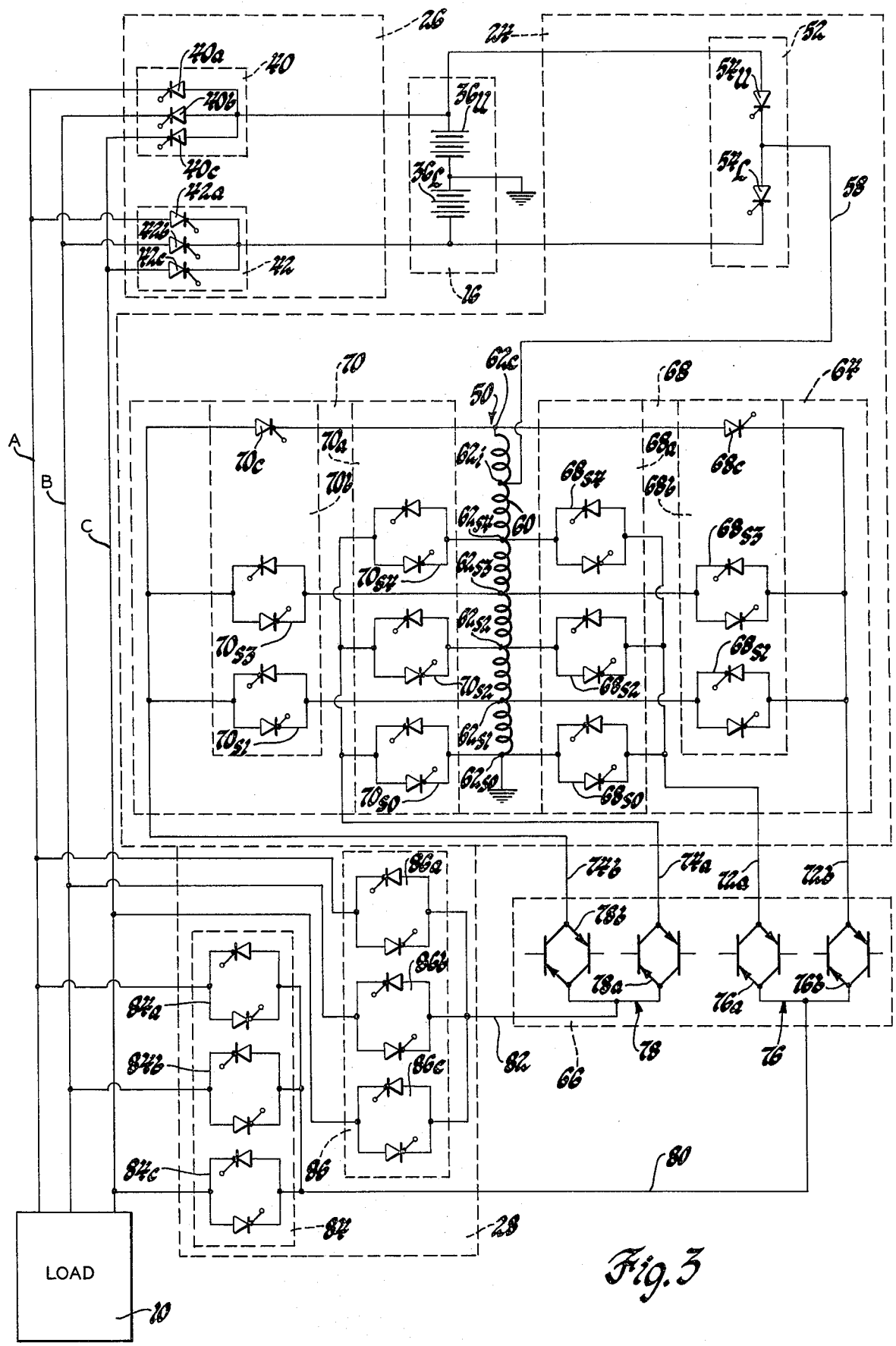
FIG. 3 is a circuit diagram of a specific apparatus for generating voltages in accordance with the present invention.

Referring to FIG. 3, the center voltage generator 26 alternately provides positive and negative power center voltage portions at three times the preselected operating frequency of the three-phase output signal on lines A, B and C. These are distributed in sequence as the portions UC and LC to the respective phases as illustrated in FIG. 2 and described above. The left/right or ascending and descending voltage generator 24 alternately produces the upper left and right voltage segments UL and UR and the lower left and right voltage segments LL and LR at three times the frequency of the three-phase output signal on lines A, B and C. The left/right voltage distributor 28 applies the upper left and right voltage portions UL and UR and the lower left and right voltage portions LL and LR of FIG. 2 to the phase lines A, B and C to define the corresponding upper and lower left and right waveform portions UL, UR, LL and LR of each line-to-neutral voltage.

Figure 4:
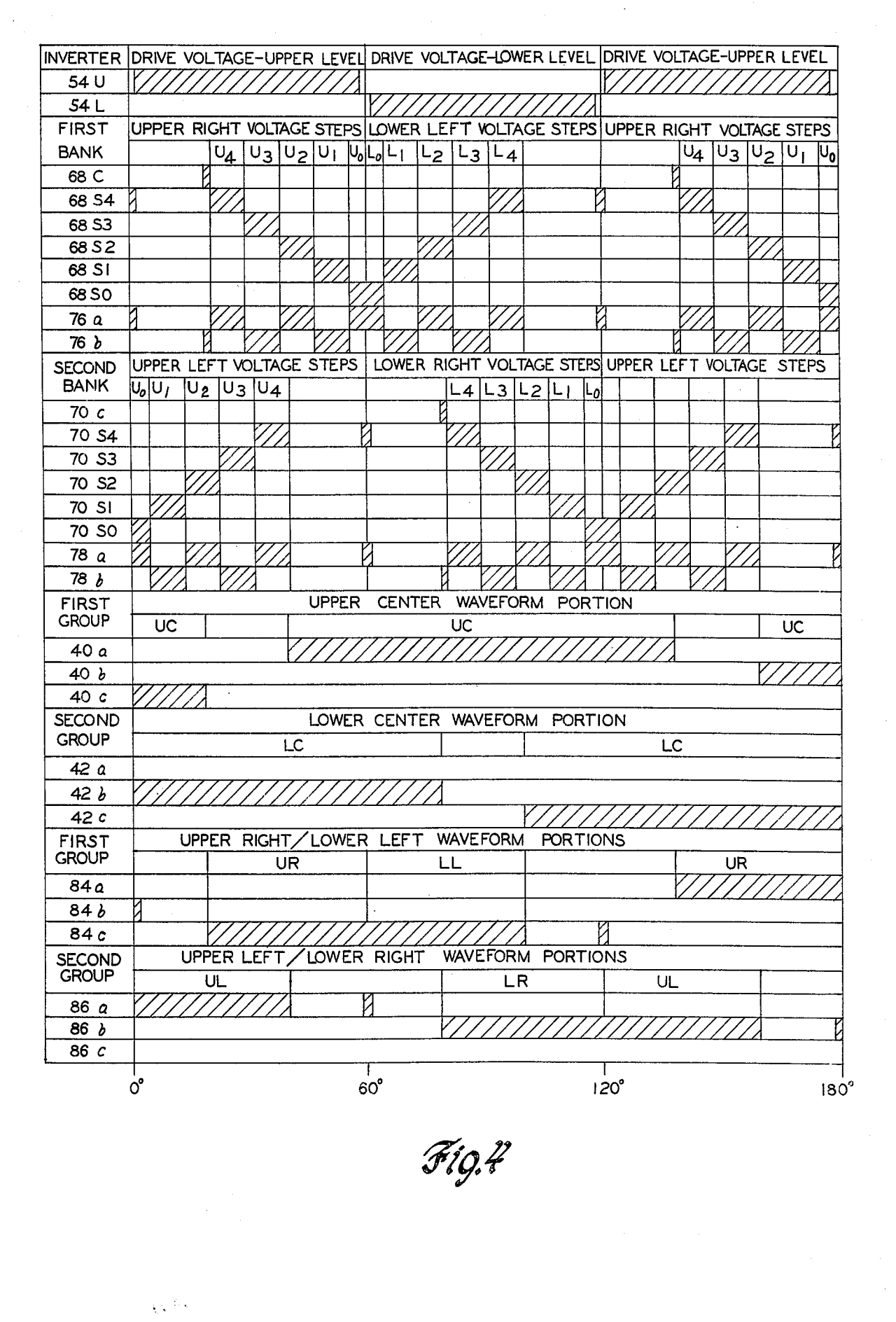

The center voltage inverter 26 includes controlled rectifiers 40a, 40b and 40c which make up a bank 40 connecting the positive terminal of the unidirectional source 16 to the respective three-phase lines A, B and C. When the rectifiers 40a, 40b and 40c are selectively made conductive, the whole voltage of the source 36U in relation to the neutral or ground connection is applied to the selected line A, B or C. Controlled rectifiers 42a, 42b and 42c similarly make up a bank 42 connecting the negative terminal of the unidirectional voltage source 16 respectively to the three-phase lines A, B and C, so that as these rectifiers are selectively gated conductive, the selected line is made negative in relation to the neutral or ground in the amount of the voltage of source 36L. The voltage sources 36U and 36L have equal output levels so that by making the respective rectifiers in banks 40 and 42 conductive, the requisite power center voltages UC and LC of FIG. 2 are applied to the line conductors. The timing diagram of FIG. 4 illustrates the period during which the respective control rectifiers are made conductive to provide a 99° power center. The rectifiers 40a, 40b, 40c, 42a, 42b and 42c are preferably silicon controlled rectifiers, each controlled rectifier being made conductive by application of a gate control voltage at the instant conduction is desired and being made nonconductive by reverse bias from a commutating pulse at the instant turn-off is desired.

The ascending and descending voltages are derived from sources 36U and 36L via the flat-top, full-wave, single-phase inverter 52. The inverter 52 includes first and second drive voltage inverter switches 54U and 54L. The first and second drive voltage inverter switches 54U and 54L are each connected between a different corresponding one of the upper and lower voltage sources 36U and 36L and an inverter output line 58. The switches 54U and 54L are preferably silicon controlled rectifiers, each controlled rectifier being made conductive by application of a gate control voltage at the instant conduction is desired and being made nonconductive by reverse bias from a commutating voltage at the instant turn-off is desired. The first and second drive voltage inverter switches 54U and 54L produce square wave drive voltage pulses on the inverter output line 58. The drive voltage alternates between the upper potential $E_{UP}$ and the lower potential $E_{LP}$ of FIG. 2 three times for each cycle of the three-phase output one lines A, B and C. Hence, the drive voltage is a square wave which alternately resides at the upper potential $E_{UP}$ and at the lower potential $E_{LP}$ during successive 60 electrical degree intervals of the line-to-line or line-to-neutral voltages.

The left/right voltage inverter 24 includes a voltage reference device or autotransformer 50 comprising a single winding 60 having a multiplicity of voltage tapes 63 including an input tape $62_i$) a group of step taps $62_{s0}$ through $62_{s4}$ and a commutator tap $62_c$ which is in voltage multiplying position relative to the input tap $62_i$. The input tap $62_i$ is connected with the inverter output line 58. The step tap $62_{s0}$ is connected to ground and therefore in common with the center tap of the source 16.

In operation, the autotransformer 50 is subjected to alternate positive and negative voltages from sources 36U and 36L applied through conductor 58 to tap $62_i$. This alternating voltage causes the flux linking the winding 60 to alternate substantially at the rate of the applied voltage between tap $62_i$ and ground. As a consequence, the taps $62_{s0}$, $62_{s1}$, $62_{s2}$, $62_{s3}$ and $62_{s4}$ substantially divide the total applied voltage in accordance with their proportionate turns as dictated by conventional transformer action. Thus, these respective tops each have substantially square-wave voltages with respect to ground that are in synchronism with the voltage at tap $62_i$.

The step taps $62_{s0}$ through $62_{s4}$ are spaced on the winding 60 so that each is at one of the upper set of step level potentials $E_{U0}$ through $E_{U4}$ of FIG. 2, when the drive voltage at the input tap $62_i$ is at the upper potential $E_{UP}$ and at one of the lower set of step level potentials $E_{L0}$ through $E_{L4}$ of FIG. 2, when the drive voltage at the input tap $62_i$ is at the lower potential $E_{LP}$.

It is noted that all the line-to-neutral waveforms of FIG. 2 include identical sets of upper and lower left and right steps and, accordingly, only one upper and one lower set of steps are labeled. Further, the commutator tap $62_c$ defines an upper commutator level $E_{UC}$ when the drive voltage at the input tap $62_i$ is at the upper potential $E_{UP}$ and defines a lower commutator level $E_{LC}$ when the drive voltage at the input tap $62_i$ is at the lower potential $E_{LP}$.

The left/right voltage inverter further includes a voltage level selector 64 and a voltage level commutator 66. The voltage level selector 64 includes first and second banks of voltage level selector switches 68 and 70. The first bank of voltage level selector switches 68 includes a first set of subbanks $68_a$ and $68_b$. The second bank of voltage level selector switches 70 includes a second set of subbanks $70_a$ and $70_b$. The subbanks $68_a$ and $68_b$ are comprised of step level selector switches $68_{s0}$ through $68_{s4}$ and a first commutator level selector switch $68_c$. The subbanks $70_a$ and $70_b$ are comprised of step level selector switches $70_{s0}$ through $70_{s4}$ and a second commutator level selector switch $70_c$. Each of the step level selector switches $68_{s0}$ through $68_{s4}$ and $70_{s0}$ through $70_{s4}$ is provided by a unicontrol bilateral electronic switch illustrated as a pair of oppositely poled controlled rectifiers. Further, the first and second commutator level selector switches $68_c$ and $70_c$ are each provided by a unicontrol unilateral electronic switch shown as a single controlled rectifier.

The voltage level selector 64 includes a first set of voltage level selector lines comprising selector lines $72_a$ and $72_b$, and a second set of voltage level selector lines comprising selector lines 74a and 74b. Each of the step level selector switches $68_{s0}$, $68_{s2}$, and $68_{s4}$ comprising the first subbank $68_a$ of the selector switches 68 is connected between the voltage level selector line $72_a$ and a different corresponding one of the step taps $62_{s0}$, $62_{s2}$ and $62_{s4}$. Each of the step level selector switches $68_{s1}$ and $68_{s3}$ comprising the second subbank $68_b$ of the selector switches 68 is connected between the voltage selector line $72_b$ and a different corresponding one of the step taps $62_{s1}$ and $62_{s3}$. In like manner, each of the step level selector switches $70_{s0}$, $70_{s2}$ and $70_{s4}$ comprising the first subbank $70_a$ of the selector switches 70 is connected between the voltage level selector line $74_a$ and a different corresponding one of the step taps $62_{s0}$, $62_{s2}$ and $62_{s4}$ and each of the step level selector switches $70_{s1}$ and $70_{s3}$ comprising the second subbank of the selector switches $70_s$ is connected between the voltage level selector line $74_b$ and a different corresponding one of the step taps $62_{s1}$ and $62_{s3}$. The commutator level selector switch $68_c$ included in the subbank $68_b$ is connected between the voltage level selector line $72_b$ and the commutator tap $62_c$. The commutator level selector switch $70_c$ included in the subbank $70_b$ is connected between the voltage level selector line $74_b$ and the commutator tap $62_c$. Thus, as described and as shown in the drawing, the voltage level selector switches in each of the four subbanks of the selector switches 68 and 70 are connected between a corresponding one of the voltage level selector lines $70_a$, $70_b$, $72_a$ and $72_b$ and non-adjacent voltage taps 62 on the autotransformer 50.

The voltage level commutator shown generally at 66 comprises first and second banks of voltage level commutator switches 76 and 78. The first bank of voltage level commutator switches 76 includes a pair of commutator switches $76_a$ and $76_b$. The second bank of voltage level commutator switches 78 includes a pair of commutator switches $78_a$ and $78_b$. The voltage level commutator switches $76_a$ and $76_b$ in the first bank 76 and the voltage level commutator switches $78_a$ and $78_b$ in the second bank 78 are each provided by a bicontrol bilateral electronic switch, shown in the drawing as a pair of oppositely poled transistors. In addition, the voltage level commutator 66 includes first and second voltage level commutator lines or voltage output lines 80 and 82.

Each of the voltage level commutator switches $76_a$ and $76_b$ is connected between a different corresponding one of the voltage level selector lines $72_a$ and $72_b$ and the first voltage level commutator line 80. Each of the voltage level commutator switches $78_a$ and $78_b$ is connected between a different corresponding one of the voltage level selector lines $74_a$ and $74_b$ and the second voltage level commutator line 82. Thus, each of the voltage level commutator switches $76_a$, $76_b$, $78_a$, and $78_b$ is connected between a different corresponding one of the subbanks $68_a$, $68_b$, $70_a$ or $70_b$ and a respective output line 80 or 82.

The first bank of voltage level commutator switches 76 combines with the first bank of step level selector switches 68 to produce the upper right voltage portions UR or the lower left voltage portions LL of FIG. 2 depending on the excitation polarity at tap $62_i$. The second bank of voltage level commutator switches 78 combines with the second bank of step level selector switches 70 to produce the upper left voltage portions UL or the lower right voltage portions LR. Further, the first and second banks of voltage level commutator switches 76 and 78 each combine with the corresponding one of the first and second commutator level selector switches $68_c$ and $70_c$ to produce a different one of the upper and lower commutator voltage pulses $S_{UC}$ and $S_{LC}$ of FIG. 2.

The upper left and right voltage portions UL and UR are formed during the intervals when the drive voltage applied to the input tap $62_i$ is at the upper potential $E_{UP}$ so that the upper set of step levels $E_{U0} - E_{U4}$ are available at the step taps $62_{s0}$ through $62_{s4}$ respectively. The bank of step level selector switches 70 connects successive ones of the transformer taps in ascending order to define the individual voltage steps $E_{U0}$ through $E_{U4}$ in the upper left voltage segment. Similarly, the bank of step level selector switches 68 connects successive ones of the transformer taps in descending order to define the individual voltage steps $E_{U0}$ through $E_{U4}$ in the upper right voltage portion UR.

In a similar manner, the lower left and right voltage portions LL and LR are formed during the intervals when the drive voltage applied to the input tap $62_i$ is at the lower potential $E_{LP}$ so that the lower set of step levels $E_{L0}$ through $E_{L4}$ are available at the step taps $62_{s0}$ through $62_{s6}$ respectively. The bank of step level selector switches 68 connects successive ones of the transformer taps in ascending order to define the individual voltage steps $E_{L0}$ through $E_{L4}$ in the lower left voltage portion LL. The bank of step level selector switches 70 connects successive ones of the transformer taps in descending order to define the individual voltage steps $E_{L0}$ through $E_{L4}$ in the lower right voltage portion LR.

In addition, when the drive voltage applied to the input tap $62_i$ is at the upper potential $E_{UP}$, an upper commutator voltage $E_{UC}$ is available at the commutator tap $62_c$. As the drive voltage shifts to the upper potential $E_{UP}$, the commutator level selector switch $68_c$ in the first bank of voltage level selector switches 68 provides the upper commutator voltage pulse $S_{UC}$ of FIG. 2. Similarly, when the drive voltage applied to the input tap $62_i$ is at the lower potential $E_{LP}$, the lower commutator voltage $E_{LC}$ is available at the commutator tap $62_c$. As the drive voltage shifts to the lower potential $E_{LP}$, the second commutator level selector switch $70_c$ in the second bank of voltage level selector switches 70 provides the lower commutator voltage pulse $S_{LC}$ of FIG. 2.

In operation, the step waves available as described are combined with a power center voltage portion from the inverter 26 to provide the three line-to-neutral voltages of FIG. 2 at any instant of time.

As previously described, the voltage level commutator switches in the first and second banks 76 and 78 are each provided by a bicontrol electronic switch and the voltage level selector switches in the first and second banks 68 and 70 are each provided by a unicontrol electronic switch. The voltage level commutator switches in each of the first and second banks 76 and 78 commutate or turn off the voltage level selector switches in a different corresponding one of the first and second banks 68 and 70. This is best understood by analyzing the operation of the first bank of voltage level commutator switches 76 and the first bank of voltage level selector switches 68. However, it is to be noted that the operation of the second bank of voltage level commutator switches 78 and the second bank of voltage level selector switches 70 is substantially identical. In the following description, the term "gated" and the term "ungated" are employed in describing the operation of the various electronic switches. An electronic switch is "gated" when a bias signal is applied to the control electrode of the switch. An electronic switch is "ungated" when the bias signal is removed from the control electrode of the switch.

When one of the voltage level selector switches $68_{s0}$, $68_{s2}$ and $68_{s4}$ in the subbank $68_a$ is gated, the voltage level commutator switch $76_a$ is also gated. In the gated condition, the voltage level commutator switch $76_a$ is conductive to permit conduction from the voltage level selector switches in the subbank $68_a$. Similarly, when one of the voltage level selector switches $68_{s1}$, $68_{s3}$ and $68_c$ in the subbank $68_b$ is gated, the voltage level commutator switch $76_b$ is also gated. In the gated condition, the voltage level commutator switch $76_b$ is conductive to permit conduction from the voltage level selector switches in the subbank $68_b$. Further, when the voltage level commutator switch $76_b$ is gated, the voltage level commutator switch $76_a$ is ungated. In the ungted condition, the voltage level commutator switch $76_a$ turns off to interrupt current from and turn off the previously gated one of the voltage level selector switches in the subbank $68_a$. Likewise, when the voltage level commutator switch $76_a$ is gated, the voltage level commutator switch $76_b$ is ungated. In the ungated condition, the voltage level commutator switch $76_b$ turns off to interrupt current from and turn off the previously gated one of the voltage level selector switches in the subbank $68_b$. This procedure is continuously repeated as the voltage level selector switches in the first bank 68 are sequentially gated in alternate ascending and descending order.

The left/right voltage distributor 28 comprises first and second groups left/right phase selector switches 84 and 86. The 145 group of left/right phase selector switches 84 includes selector switches $84_a$, $84_b$ and $84_c$, and the second group of left/right phase selector switches 86 includes selector switches $86_a$, $86_b$ and $86_c$. Each of the phase selector switches $84_a$, $84_b$, $84_c$ and $86_a$, $86_b$ and $86_c$ is provided by a unicontrol bilateral electronic switch illustrated in the drawing by two oppositely poled controlled rectifiers. Each of the left/right phase selector switches $84_a$, $84_b$ and $84_c$ in the first group 84 is connected between a different corresponding one of the phase lines A, B and C and the first voltage output line 80. Each of the left/right phase selector switches $86_a$, $86_b$ and $86_c$ in the second group 86 is connected between a different corresponding one of the phase lines A, B and C and the second voltage output line 82.

Each of the first and second groups of left/right phase selector switches 84 ad 86 applies a respective one of the upper left and right voltage portions UL and UR and a respective one of the lower left and right voltage portions LL and LR to the phase lines A, B and C to define the corresponding upper and lower left and right waveform portions in each cycle of each of the line-to-neutral voltage waveforms $V_{a-n}$, $V_{b-n}$ and $V_{c-n}$ shown in FIG. 2. More particularly, the left/right phase selector switches in the first group 84 transmit the one of the upper left and right voltage portions UL and UR and the one of the lower left and right voltage portions LL and LR appearing on the first voltage output line 80. Similarly, the left/right phase selector switches in the second group 86 transmit the one of the upper left and right voltage portions UL and UR and the one of the lower left and right voltage portions LL and LR appearing on the second voltage output line 82.

The generation of the upper and lower center voltage segments UC and LC on the respective phase lines A, B and C by the first and second banks of center phase selector switches 40 and 42 is effective for commutating the first and second groups of left/right phase selector switches 84 and 86 through forced or reversed bias commutation. In particular, the upper center voltage portion UC is applied by the center voltage phase selector switches in the first bank 40 to turn off the left/right phase selector switches in one of the first and second groups 84 and 86 which transmits the upper left voltage portion UL. The lower center voltage portion LC is applied by the center voltage phase selector switches in the second bank 42 to turn off the left/right phase selector switches in the one of the first and second groups 84 and 86 which transmits the lower left voltage portion LL.

In addition, each of the first and second groups of left/right phase selector switches 84 and 86 applies a respective one of upper and lower commutator voltage pulses $S_{UC}$ and $S_{LC}$ to the phase lines A, B and C to commutate a different one of the first and second banks of center voltage phase selector switches 40 and 42 through forced or reversed bias commutation. More specifically, the upper commutator voltage pulse $S_{UC}$, which is generated by gating the controlled rectifier $68_c$ and the switch $76_b$ conductive is applied by the left/right phase selector switches in the first group 84 to turn off or commutate the controlled rectifiers in the first bank 40 which transmit the upper center voltage portion UC. Similarly, the lower commutator voltage pulse $S_{LC}$ which is generated by gating the controlled rectifier $70_c$ and the switch $78_b$ conductive just prior to the voltage segment LR is applied by the left/right phase selector switches in the second group 86 to turn off or commutate the controlled rectifiers in the second bank 42 which transmit the lower center voltage portion LC.

Referring to FIG. 2, when the power center portions UC and LC exceed 60 electrical degrees, at the time the controlled rectifier 54U is scheduled to be commutated and prior to the gating of the controlled rectifier 54L to supply a negative drive voltage to the input tap $62_i$ of the autotransformer 50, one of the controlled rectifiers in group 40 is conducting and supplying the positive power center segment UC. Further, at the time when the controlled rectifier 54L is required to be commutated and prior to the gating of the controlled rectifier 54U to supply a positive drive voltage to the input tap $62_i$ of the autotransformer 50, one of the controlled rectifiers in group 42 is conducting and supplying the negative power center segment LC. These power center segments can be used to commutate the controlled rectifiers 54U and 54L by coupling the respective power center segments to the tap $62_{s4}$ of the autotransformer 50. By transformer action a voltage is generated at tap $62_i$ which reverse biases the respective controlled rectifier 54U or 54L. For example, in the waveform illustrated in FIG. 2, prior to the 60 degree point of the three-phase waveform, the controlled rectifier 54U is conducting to supply the positive drive voltage to the input tap $62_i$ of the transformer 50. After the upper right voltage segment UR is stepped to the voltage level $E_{c0}$ the controlled rectifier 54U must be commutated and then the controlled rectifier 54L gated to apply a negative drive voltage to the input tap $62_i$ of the autotransformer 50. As can be seen, at and prior to the 60 degree point, the controlled rectifier 40A is conducting to supply the upper power center UC through the output line A. This upper power center is used to commutate the controlled rectifier 54U by momentarily gating the switch 86a, the switch 78a and the switch $70_{s4}$ which are all made conductive to couple the upper power center UC to the tap $62_{s4}$. Through transformer action, the voltage at tap $62_i$ increases to above the potential $E_{cP}$ of the upper power center UC to reverse bias the controlled rectifier 54U which is commutated thereby. The controlled rectifier 54L is then gated conductive to apply the negative drive voltage to the input tap $62_i$ of the autotransformer 50. In like manner, the controlled rectifier 54L is commutated at approximately 120° of the waveform of FIG. 2 by coupling the negative power center portion LC on line C to the tap $62_{s4}$ of the autotransformer 50 by momentarily gating the switches 84c, 76a and $68_{s4}$ conductive. Again, through transformer action, the voltage at tap $62_i$ increases in magnitude to reverse bias and commutate the controlled rectifier 50L. As can be seen from the foregoing, by generating the line-to-neutral waveforms having a power center exceeding 60 electrical degrees, commutating switches and voltage sources for commutating the controlled rectifiers 54U and 54L can be eliminated by using the power center segments UC and LC to provide for commutation.

FIG. 4 represents a diagram which defines the operation of the various electronic switches in the left/right voltage generator 24, the center voltage distributor 26 and the left/right voltage distributor 28 over a 180 electrical degree interval. The timing sequence illustrated in FIG. 4 is repeated twice to form a full cycle of 360 electrical degrees. The cross-hatched areas in FIG. 4 represent the time periods during which the respective electronic switches are gated conductive to provide for the generation of the line-to-neutral waveforms of FIG. 2 and to provide for the commutation of the controlled rectifiers in the center voltage inverter 26 and the commutation of the controlled rectifiers in the inverter 52 by the power center segments.

The control and timing sequence of FIG. 4 produces a waveform having five voltage steps and a 99° power center as illustrated in FIG. 2.

The requisite overall timing control may be achieved by providing a suitable source of pulses, serving as clock pulses. These are preferably fed to a digital counter, which counts a selected number of clock pulses, resets to zero, and then repeats the count. Each full count represents the full 360 degrees period. Such a system for generating the gating pulses is described generally in my U.S. Pat. No. 3,725,767 to which reference may be made for more specific details.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. A three-phase inverter for generating sine-wave voltages at a preselected frequency across a set of three-phase line conductors from a unidirectional voltage source having a center tap coupled to a reference potential comprising: a first inverter connected between the source and the line conductors for producing flat-topped output voltage segments alternating between an upper potential above a reference potential and a lower potential below the reference potential at a rate three times the desired frequency and developing three-phase, full-wave, flat-top voltages on the conductors at the desired frequencies, each segment extending over an interval greater than 60 electrical degrees and being terminated by a first commutating voltage on the respective line conductor; a second inverter connected to the source and operating in synchronism with the first inverter for producing at its output signal-phase, flat-top voltages alternating between the upper and lower potential at a rate three times the desired frequency, each half cycle of the single-phase, flat-top voltage being terminated by a second commutating voltage applied to the output of the second inverter; an inductor having an input tap connected to the output of the second inverter, a low voltage tap connected to the reference potential and a plurality of intermediate voltage taps between the low voltage tap and the input tap, whereby alternating flat-top voltage excitation is applied across the input and low voltage taps, the inductor further having a step-up tap in voltage multiplying position in relation to the flat-top voltage; a voltage distributor including a first channel having an input and means for selectively coupling said input to the line conductors in synchronism with the first inverter and a second channel having an input and means for coupling said input to the line conductors in synchronism with the first inverter; means or connecting the low voltage and intermediate taps to the inputs of each of the first and second channels during the period said channels are coupled to a respective line conductor in ascending and descending order in synchronism with the first inverter to approximate on the line conductors, in relation to the reference potential, a balanced and symmetrical voltage; means for momentarily coupling the step-up tap to the inputs of each channel, respectively, at the beginning of the period said channels are coupled to a respective line conductor to supply the first commutating voltage to commutate the first inverter; and means for momentarily coupling a respective one of the line conductors having a flat-top voltage segment thereon to one of the intermediate taps of the inductor at the end of each half cycle of the single-phase, flat-top voltage to generate the second commutating voltage at the input tap of the inductor for commutating the second inverter.

2. A three-phase inverter for generating sine-wave voltages at a preselected frequency across a set of three-phase line conductors from a unidirectional voltage source having a center tap coupled to a reference potential comprising: a first inverter connected between the source and the line conductors for producing flat-topped output voltage segments alternating between an upper potential above a reference potential and a lower potential below the reference potential at a rate three times the desired frequency and developing three-phase, full-wave, flat-top voltages on the conductors at the desired frequencies, each segment extending over an interval greater than 60 electrical degrees and being terminated by a first commutating voltage on the respective line conductor having the same polarity as said segment relative to the reference potential and having a magnitude greater than said segment; a second inverter connected to the source and operating in synchronism with the first inverter for producing at its output single-phase, flat-top voltages alternating between the upper and lower potential at a rate three times the desired frequency, each half cycle of the single-phase, flat-top voltage being terminated by a second commutating voltage applied to the output of the second inverter having the same polarity as said half cycle of the single-phase voltage relative to the reference potential and having a magnitude greater than said half cycle of the single-phase voltage; an inductor having an input tap connected to the output of the second inverter, a low voltage tap connected to the reference potential and a plurality of intermediate voltage taps between the low voltage tap and the input tap, whereby alternating flat top voltage excitation is applied across the input and low voltage taps, the inductor further having a step-up tap in voltage multiplying position in relation to the flat-top voltage; a voltage distributor including a first channel having an input and three bidirectional switches each coupled between the input and a respective one of the line conductors and a second channel having an input and three bidirectional switches each coupled between said input and a respective one of the line conductors; means for selectively energizing the bidirectional switches in the first and second channels to couple the inputs thereof to the line conductors in synchronism with the first inverter; a first group of bidirectional switch means connected between the low voltage and intermediate taps and the input of the first channel; a second group of bidirectional switch means connected between the low voltage and intermediate taps and the input of the second channel; means for selectively energizing the bidirectional switches in the first and second groups during each period said first and second channels are coupled to a respective line conductor to couple the low voltage and intermediate taps to the inputs of said first and second channels in ascending and descending order in synchronism with the first inverter to approximate on the line conductors, in relation to the reference potential, a balanced and symmetrical voltage; means for momentarily coupling the step-up tap to the inputs of each channel, respectively, at the beginning of the period said channels are coupled to a respective line conductor to supply the first commutating voltage to commutate the first inverter; and means for momentarily energizing a respective one of the bidirectional switches in the first or second channels and one of the bidirectional switches in the first or second group to couple a respective one of the line conductors having a flat top voltage segment thereon with the same polarity as the single-phase voltage to one of the intermediate taps of the inductor at the end of each half cycle of the single-phase, flat-top voltage to generate the second commutating voltage at the input tap of the inductor for commutating the second inverter.

* * * * *